United States Patent
Riva et al.

(10) Patent No.: US 12,169,813 B2
(45) Date of Patent: Dec. 17, 2024

(54) METHODS AND SYSTEMS FOR FACILITATING SHARING OF TOKENS IN BLOCKCHAIN TRANSACTIONS

(71) Applicant: PAYPAL, INC., San Jose, CA (US)

(72) Inventors: Ben Riva, Givatayim (IL); Sujay Vijay Purandare, Portland, OR (US)

(73) Assignee: PAYPAL, INC., San Jose, CA (US)

( * ) Notice: Subject to any disclaimer, the term of this patent is extended or adjusted under 35 U.S.C. 154(b) by 167 days.

(21) Appl. No.: 17/941,850

(22) Filed: Sep. 9, 2022

(65) Prior Publication Data

US 2024/0086873 A1 Mar. 14, 2024

(51) Int. Cl.
*G06Q 20/06* (2012.01)

(52) U.S. Cl.
CPC .................................. *G06Q 20/065* (2013.01)

(58) Field of Classification Search
CPC .................................................... G06Q 20/065
See application file for complete search history.

(56) References Cited

U.S. PATENT DOCUMENTS

| | | | |
|---|---|---|---|
| 10,891,613 B1 | 1/2021 | Schindler | |
| 11,488,245 B2 * | 11/2022 | Pierce | G06Q 20/381 |
| 2016/0086175 A1 * | 3/2016 | Finlow-Bates | G06Q 20/4015 705/77 |
| 2018/0096175 A1 | 4/2018 | Schmeling et al. | |
| 2019/0081789 A1 | 3/2019 | Madisetti et al. | |
| 2023/0186255 A1 * | 6/2023 | Hertzog | G06Q 20/389 705/75 |

OTHER PUBLICATIONS

Connor Lovely, Crypto's Latest Tokenomic Innovation: the Sharing of Gas Fees with Developers, Aug. 17, 2023, Iotex, Governance, Retrieved from the Internet: https://iotex.io/blog/tokenomic-sharing-gas-fees-developers/ (Year: 2023).*

(Continued)

*Primary Examiner* — Paul S Schwarzenberg
(74) *Attorney, Agent, or Firm* — Haynes and Boone, LLP

(57) ABSTRACT

Methods and systems are presented for providing a framework for facilitating token sharing with contract issuers based on processing of smart contract transactions. The framework provides a mechanism for allowing one or more computer nodes within a blockchain network to opt-in to a token sharing agreement with a contract issuer and a mechanism for an opted-in computer node to share tokens with the contract issuer in a decentralized manner. When a computer node has opted-in to the token sharing agreement, the computer node, by executing a smart contract, performs a set of computer procedures that is non-productive to the processing of the smart contract transaction. The execution of the set of non-productive computer procedures provides an additional amount of processing fee based on the processing of the smart contract transaction. The computer node then transfers a portion of the additional amount of processing fee to an account of the contract issuer as part of the processing of the smart contract.

20 Claims, 5 Drawing Sheets

(56) References Cited

OTHER PUBLICATIONS

Keir Finlow-Bates, LinkedIn, Fair Compensation for Smart Contracts, Oct. 31, 2023, Retrieved from the Internet: https://www.linkedin.com/pulse/fair-compensation-smart-contracts-keir-finlow-bates-oxhmf (Year: 2023).*

Ameer Rosic, Who Earns Ethereum Gas Fees: An In-depth Guide, Sep. 21, 2023, Blockgeeks, Retrieved from the Internet: https://blockgeeks.com/guides/who-earns-ethereum-gas-fees-an-in-depth-guide/ (Year: 2023).*

Bessie Liu, This Ethereum Proposal Wants to Bring Revenue Back to Developers, Blockworks, May 19, 2023, Retrieved from the Internet: https://blockworks.co/news/ethereum-proposal-developers-revenuers (Year: 2023).*

International Search Report and Written Opinion for Application No. PCT/US2023/030506 mailed on Apr. 17, 2024, 10 pages.

* cited by examiner

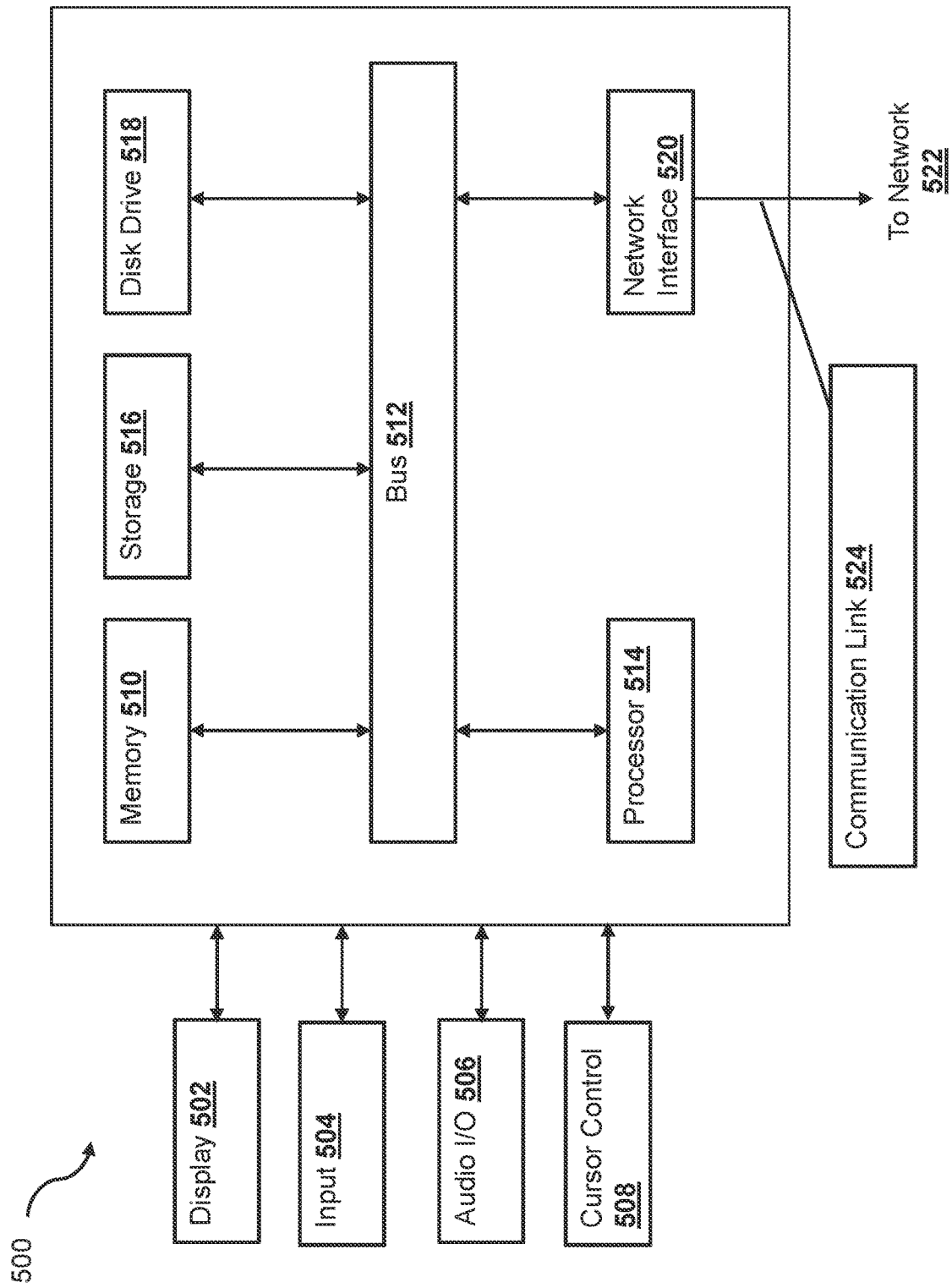

METHODS AND SYSTEMS FOR FACILITATING SHARING OF TOKENS IN BLOCKCHAIN TRANSACTIONS

BACKGROUND

The present specification generally relates to blockchain transactions, and more specifically, to facilitating dynamic executions of smart contract transactions according to various embodiments of the disclosure.

RELATED ART

Smart contracts are a growing branch under blockchain technologies. In essence, a smart contract is a computer program that is stored on a blockchain, and can be executed by any computer node within the distributed network associated with the blockchain to perform smart contract transactions for users. Certain blockchain networks, such as the Ethereum blockchain network, support and facilitate the execution of smart contract transactions by providing a standard (e.g., the ERC-20 standard) for the smart contract (e.g., the computer program associated with the smart contract) to interact with the blockchain. Thus, a contract issuer may generate a smart contract based on the standard. Since a smart contract can include user-generated computer programming code, the contract issuer has the flexibility to design the smart contract to perform customized computer logic.

Once a smart contract is generated and recorded on a blockchain, the smart contract can be used (e.g., executed) by the computer nodes within the distributed network associated with the blockchain to process smart contract transactions for different users. Similar to other types of blockchain transactions, the computer node that is ultimately selected to process a smart contract transaction would generate transaction data to be included in a block for recordation on the blockchain. The computer node may also charge a processing fee (in the form of a native token associated with the blockchain) for processing the smart contract transaction. For some smart contracts, e.g., ones that follow the ERC-20 standard, after the smart contract is generated, the contract issuer is not benefitted (e.g., not compensated) from any smart contract transactions. The ERC-20 standard also does not support the inclusion of the contract issuer when processing any smart contract transactions. Without incentives or other financial motivation, contract issuers may be less likely to generate smart contracts, resulting in less use and growth of smart contracts and more broadly blockchain networks. Thus, there is a need for providing a mechanism that can be incorporated into smart contracts to incentivize contract issuers to generate smart contracts for the blockchain network.

BRIEF DESCRIPTION OF THE FIGURES

FIG. 5 is a block diagram of a system for implementing a device according to an embodiment of the present disclosure.

Figure 1:
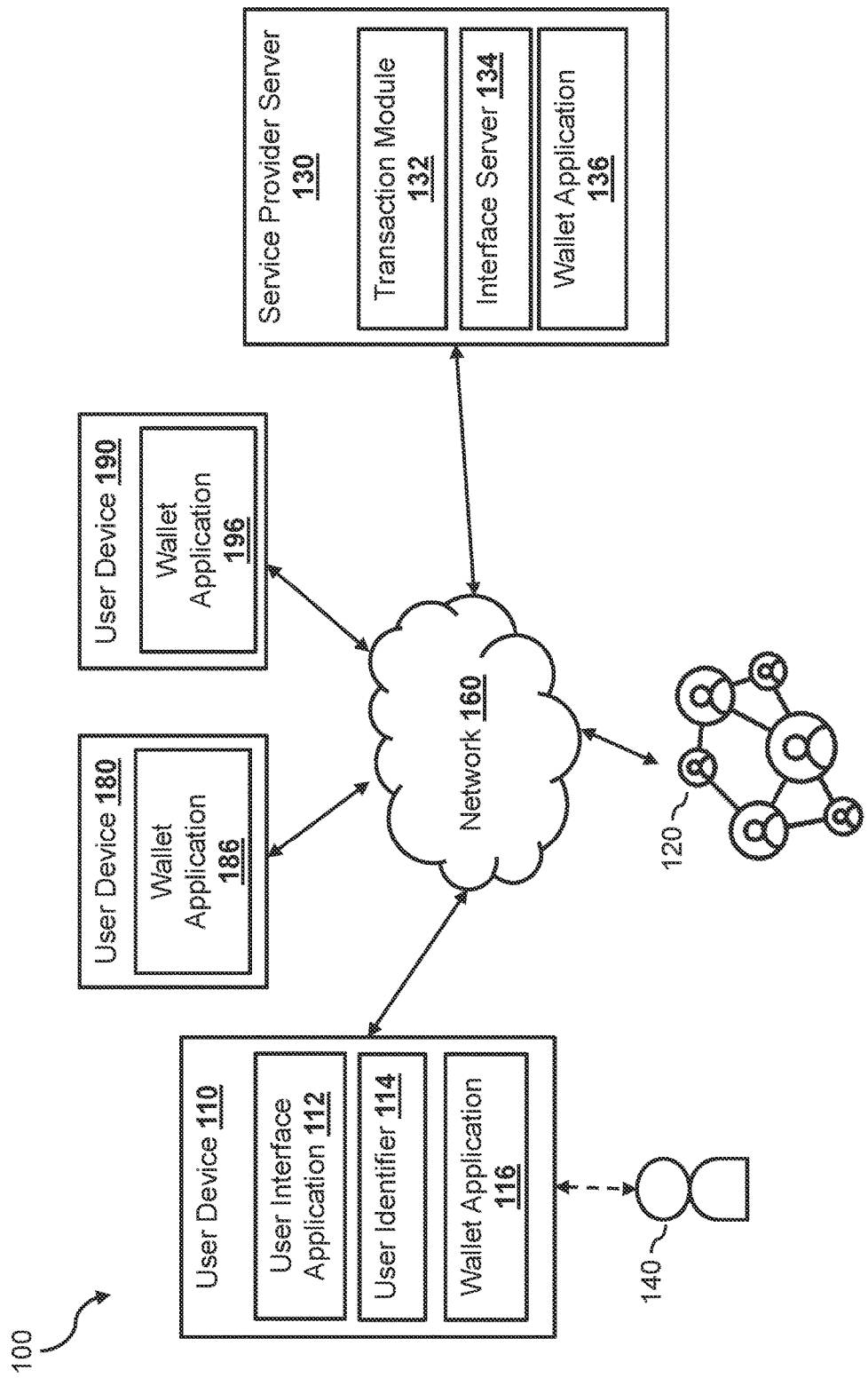
FIG. 1 is a block diagram illustrating a networked system that includes an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for dynamically incorporating computer procedures while processing smart contract transactions. As discussed herein, once a smart contract is generated and recorded on a blockchain, the contract issuer (which can be a person, an organization, or an artificial intelligence computer system) who created the smart contract is no longer involved in subsequent smart contract transactions between different users. For example, a contract issuer may generate a smart contract including computer programming code for automatically transferring tokens from an account of a buyer to an account of a seller upon detecting an indication that an item has been delivered at a physical location associated with a buyer. Once the smart contract is generated and recorded on a blockchain, different buyers and sellers can conduct smart contract transactions based on the smart contract. Each smart contract transaction may be tailored to the specific buyer and seller by providing different parameters to the smart contract, such as a specific location for detecting the delivery of the item, an amount or number of tokens to be transferred, etc. Either the buyer or the seller can initiate the smart contract transaction through their accounts by providing transaction information associated with the smart contract transaction (e.g., an identifier of the specific smart contract being used in the smart contract transaction, parameters to be provided to the smart contract, identifiers of the buyer and seller, etc.) to the distributed network. A computer node within the distributed network may then be selected (e.g., through a proof-of-work process, through a proof-of stake process, etc.) to process the smart contract transaction. Thus, the processing of the smart contract transaction only involves the computer node and the parties associated with the smart contract transaction (e.g., the buyer and the seller, etc.).

The exclusion of the contract issuer in processing smart contract transactions prevents the contract issuer from receiving benefits (e.g., tokens, monetary currency, etc.) as part of the process of processing the smart contract transactions. This is in part due to the standards that facilitate smart contract transactions (e.g., the ERC-20 standard) for various blockchain networks lacking the interface for compensating the contract issuer in processing of smart contract transactions.

For example, when a computer node is selected to process a smart contract transaction, the computer node may execute programming logic associated with the smart contract. The programming logic may require the computer node to detect whether one or more conditions exist (e.g., whether a confirmation that an item has been delivered to a party to the smart contract transaction is received). When it is detected that all of the conditions set forth in the smart contract are satisfied, the computer node, based on executing the smart contract, may transfer tokens (and/or a cryptocurrency amount) between accounts associated with the parties to the smart contract transaction by recording the smart contract transaction on the blockchain. The standard may also enable the computer node that is selected to process the smart contract transaction to receive one or more tokens from one or more of the parties involved in the smart contract transaction as a processing fee for processing the smart contract transaction. Through the processing of the smart contract transaction, the computer node is not enabled to transfer any tokens to an entity that is not the computer node or a party to the smart contract transaction according to the standard.

An entity that operates the computer node (e.g., a block producer) may enter into an agreement (e.g., a separate agreement from the smart contract) with the contract issuer, which requires the entity to transfer tokens to (e.g., sharing a portion of the processing fee with) an account associated with the contract issuer in response to processing a smart contract transaction. However, since the transfer of the tokens to the account associated with the contract issuer is not part of the smart contract, such a transfer is not guaranteed unless it is enforced by a third-party (e.g., a centralized authority figure), which goes against the very principles behind blockchain technologies as a decentralized and distributed platform for processing transactions. Thus, it is a challenge to involve the contract issuer in processing smart contract transactions according to any one of the standards and without diminishing the decentralized and distributed qualities of blockchain transactions.

As such, according to various embodiments of the disclosure, a framework is established to facilitate transfer of tokens to a contract issuer by dynamically incorporating computer procedures into a smart contract while processing smart contract transactions associated with the smart contract. The framework may include a mechanism for allowing any one of the computer nodes within a blockchain network to opt-in to a token-sharing agreement (also referred to as a "fee-sharing agreement") with the corresponding contract issuer of the smart contract and a mechanism for the opted-in computer node to share tokens with the corresponding contract issuer as part of the processing of the smart contract transactions. For example, the framework may specify a format for indicating an opt-in to the token-sharing agreement on the blockchain. In some embodiments, any computer node can decide whether to participate in the token-sharing agreement with the contract issuer. The framework may specify a specific type of transaction to be recorded on the blockchain that indicates an opt-in to the token-sharing agreement. A block producer who wishes to participate in the token-sharing agreement with the contract issuer may record (e.g., via the computer node within the blockchain network) an opt-in transaction according to the specification by the framework on the blockchain.

In order to facilitate the transfer of tokens from an account associated with the block producer to the account associated with the contract issuer for the processing of smart contract transaction without requiring an involvement of third-parties (e.g., a centralized authority figure, etc.), the transfer has to be performed as part of the processing of the smart contract transaction, which means the smart contract needs to have access to the tokens associated with the block producer. As such, once the block producer has opted-in to the fee sharing agreement (or as part of the opt-in process), the block producer is required to provide the smart contract access to at least a portion of the tokens controlled by the block producer, such that the transfer of tokens can be performed during the execution of the smart contract.

The sharing of access to the tokens (or a portion of the tokens) can be implemented in different manners under the framework. In some embodiments, the block producer can give permission to external entities to transfer tokens from the account of the block producer via recording the permission in a block on the blockchain. The recording of the permission would enable any device that executes the smart contract to access the tokens in the account while executing the smart contract. A disadvantage of this approach is that after the recording of the permission, the account associated with the block producer may be at risk since any third-party entities can access the tokens for unauthorized purposes.

Under a different approach, as the block producer opted-in to the fee sharing agreement, the framework may require the block producer to lock a certain amount of tokens controlled by the block producer on the blockchain (for example, via recording a lock transaction of the tokens on the blockchain). Once the tokens are locked, the block producer may not use it in any transactions. In a way, the locked tokens serve as a collateral to guarantee that the block producer has sufficient tokens to transfer to the contract issuer. The block producer and the contract issuer may settle the token transfer during or after processing of the smart contract transactions. The block producer may unlock the tokens (e.g., via recording an unlock transaction of the tokens on the blockchain) when the block producer decides to opt-out of the token-sharing agreement. This approach is safer for the block producer as it does not give any third-party entities access to the tokens controlled by the block producer. However, such an approach may be inefficient as the amount of tokens that is locked has to be sufficient to cover the transfer of tokens to the contract issuer for subsequent processing of smart contract transactions, and they are unusable by the block producer until the block producer opts out of the token-sharing agreement.

In some embodiments, the framework may enable the block producer to take a locking on-demand approach. Under this approach, the block producer may lock an amount of tokens before processing of each smart contract transaction, and unlock the tokens after processing of the smart contract transaction (e.g., in the same block). This way, only a small amount of tokens is required to be locked each time, and any remaining tokens that are not shared with the contract issuer can be unlocked after the processing of the smart contract transaction is completed. Thus, when processing a smart contract transaction, the block producer may record several transactions in the same block, including a first transaction associated with locking an amount of tokens (sufficient for use in sharing tokens with the contract issuer), a second transaction associated with smart contract transaction, a third transaction for transferring one or more tokens to the account associated with the contract issuer, and a fourth transaction for unlocking at least a portion of the locked tokens. This approach provides improvement to the previous approach as tokens of the block producer are only locked while a smart contract transaction is being processed. Since this approach requires adding lock/unlock transactions in individual blocks, a block issuer may end up paying transaction fees for the lock/unlock transactions which can incur more costs than just performing the smart contract transaction itself.

With the mechanism for opting-in to the token-sharing agreement and the mechanism for sharing tokens in place, the framework may provide additional programming logic for the smart contract, such that the smart contract, when executed by a computer node within the blockchain network, can perform additional computer procedures related to the sharing of tokens with the contract issuer. For example, the smart contract may include additional programming code associated with computer logic for determining whether the block producer associated with the computer node that is selected to process the smart contract has opted-in to the token-sharing agreement. The smart contract may also include additional programming code associated with computer logic for locking an amount of tokens controlled by the block producer to be used in processing the smart contract transaction (e.g., to be shared with the contract issuer, etc.), computer logic for determining an amount of tokens to be transferred to the contract issuer, computer logic for transferring the amount of tokens from an account associated with the block producer to the account of the contract issuer, and computer logic for unlocking the tokens.

As discussed herein, when a computer node is selected (e.g., through a proof-of-work process, through a proof-of-stake process, etc.) to process a smart contract transaction, the computer node is eligible to receive an amount of tokens (e.g., native tokens, etc.) as a processing fee for processing the smart contract transaction according to the protocol. The amount of tokens that serves as the processing fee may be determined based on the amount of computer processing required by the computer node to process the smart contract transaction. Thus, a more complex smart contract transaction that requires a substantial amount of computer processing resources to process would give rise to a larger amount of process fees than a less complex smart contract transaction. Since that amount of tokens is used for compensating the computer node for processing the smart contract transaction, the block producer may not want to share the processing fee with the contract issuer, which essentially would reduce the block producer's compensation.

One solution under the framework is to increase the processing fee for processing a smart contract transaction so that the block producer may share a portion of the additional processing fee with the contract issuer. As mentioned earlier, the processing fee for processing a smart contract transaction is typically tied to the amount of processing resources required to process the smart contract transaction according to the standard (e.g., the processing fee is automatically computed within the blockchain network based on the standard). Thus, in order to increase the processing fee, the smart contract may include a programming code for dynamically increasing the amount of processing resources required for processing the smart contract. For example, the smart contract may include a set of computer procedures that is non-productive (or not needed) with respect to the processing of the smart contract. The set of computer procedures may include "dummy" processes, such as performing a random calculation that is unrelated to the processing of the smart contract, etc. By incorporating the set of computer procedures in the smart contract, additional processing fees (e.g., an additional amount of tokens) may be obtained by the computer node (e.g., from one or more parties involved in the smart contract transaction) for processing the smart contract. The additional processing fees (the additional amount of tokens) is defined as any additional tokens charged to the one or more parties for processing of the smart contract due to the inclusion of the set of computer procedures. In other words, the additional amount of tokens can be calculated as the total amount of tokens being charged for processing the smart contract that includes the set of computer procedures minus a hypothetical amount of tokens that would have been charged for processing the smart contract that does not include the set of computer procedures.

The smart contract may also include programming code for sharing a portion of the additional amount of tokens with the contract issuer. For example, the smart contract, when executed by the computer node, may calculate a portion of the additional amount of tokens, and record on the blockchain a transfer of the portion of the additional amount of tokens from the account associated with the block producer to the account associated with the contract issuer.

In some embodiments, the smart contract may also include programming code for dynamically determining the additional amount of processing fees for processing a smart contract transaction. For example, the additional amount of processing fees may be determined based on one or more factors, such as an amount of tokens involved in the smart contract transaction (e.g., an amount of tokens that is transferred between the parties), identities of the parties involved in the smart contract transaction, a time of day, a number of transactions being processed by the computer node within a time period (e.g., the last hour, the last day, etc.), or any other factors.

Thus, the smart contract may include programming code to determine the additional amount of processing fees. Since the processing fees are tied to the amount of computer resources required or that are used to execute the smart contract, the smart contract may dynamically adjust the number of computer procedures to be executed by the computer node. In some embodiments, the smart contract may include programming code associated with the computer procedure that is non-productive with respect to the processing of a smart contract transaction. The smart contract may include the programming code inside a loop (e.g., a "for" loop, a "while" loop, etc.), and may iteratively perform the computer procedure as many times as it desires. Once the smart contract determines the amount of additional processing fees to charge for processing a smart contract transaction, the smart contract may adjust the number of iterations for performing the computer procedure, such that the amount of the computer resources used to process the smart contract transaction can be dynamically adjusted.

Accordingly, under the framework as disclosed herein, when a smart contract is being executed by a computer node selected to process a smart contract transaction (as part of the blockchain protocol), the computer node may first determine whether a block producer that includes the smart contract transaction in a block has opted-in to a fee sharing agreement with the contract issuer. The computer node may traverse the blockchain to determine whether a transaction associated with the block producer opting-in to the token-sharing agreement is recorded. If the block producer has not opted-in to the fee sharing agreement, the computer node may execute the smart contract to process the smart contract transaction in a typical manner (e.g., in the same manner as if it is executed outside of the framework). However, if it is determined that the block producer has opted-in to the token-sharing agreement, the computer node, based on executing the smart contract, may lock an amount of tokens controlled by the block producer. The computer node may also determine an additional amount of processing fee to charge for processing the smart contract transaction based on one or more factors. The computer node may then iteratively execute a first set of computer procedures (that is non-productive to the processing of the smart contract transaction) for a number of times such that the additional amount of processing fee is charged for processing the smart contract transaction.

The computer node may also execute a second set of computer procedures that is productive to (or needed for) the processing of the smart contract transaction (e.g., detecting whether an item has been delivered at a predefined location, a transfer of tokens between the parties involved in the smart contract transaction, other computations specified in the smart contract, etc.). Based on the processing of the smart contract, the block producer may receive a processing fee (e.g., in the form of one or more tokens, etc.). The processing fee may include an additional amount of processing fee that is charged based on the execution of the first set of computer procedures that is non-productive to the processing of the smart contract transaction. The computer node may transfer a portion of the additional amount of processing fee from the account of the block producer to the account of the contract issuer, and then unlock the remaining tokens controlled by the block producer. Thus, using the framework as disclosed herein, a contract issuer who created a smart contract can participate in sharing tokens that are obtained from processing smart contract transactions associated with the smart contract, without deviating from the standard and without sacrificing the decentralized and distributed qualities of blockchain technologies.

FIG. 1 illustrates a networked system 100, within which the framework may be implemented according to one embodiment of the disclosure. Note that the present techniques may be applied in many different computing and technological environments, however, and are not limited to those shown in the figures. The networked system 100 includes a service provider server 130, a blockchain computer network 120, and user devices 110, 180, and 190 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The blockchain computer network 120 may include multiple computer nodes for managing transactions (e.g., smart contract transactions, etc.) associated with a decentralized and distributed ledger (e.g., a blockchain). The decentralized and distributed ledger may store transaction data related to transactions conducted through the blockchain. For example, when the blockchain computer network 120 is configured to support smart contract transactions according to a smart contract standard (e.g., an ERC-20 standard, etc.), the ledger (i.e., the blockchain) may store transaction data related to smart contract transactions. Each computer node within the blockchain computer network 120 manages a copy of the distributed ledger. When a contract issuer generates and records a smart contract on the blockchain, a copy of the smart contract is stored on each computer node within the blockchain computer network 120. As such, each computer node within the blockchain computer network 120 may store multiple smart contracts generated by one or more contract issuers, and any one of the computer nodes can process a smart contract transaction for users by executing a corresponding smart contract.

For example, a contract issuer may generate a smart contract including computer programming code for automatically transferring tokens from an account of a first entity to an account of a second entity upon detection of one or more conditions (e.g., a number of employees hired by an organization exceeding a threshold number, a delivery of an item, etc.). Once the smart contract is generated and recorded on a blockchain, different entities can conduct smart contract transactions based on the smart contract. Each smart contract transaction may be tailored to the specific entities by providing different parameters to the smart contract, such as an identity of the organization, an amount of tokens to be transferred, etc. Either entity can initiate the smart contract transaction through their accounts by providing transaction information associated with the smart contract transaction (e.g., an identifier of the specific smart contract being used in the smart contract transaction, parameters to be provided to the smart contract, identifiers of the entities, etc.) to the blockchain computer network 120. A computer node within the block chain computer network 120 may then be selected to process the smart contract transaction.

When the computer nodes receive transaction data associated with a smart contract transaction from a device (e.g., the user devices 110, 180, and 190, etc.), the computer nodes compete against each other in solving a mathematical problem (which is part of a verification process such as a proof-of-work process or a proof-of-stake process). Once a computer node solves the mathematical problem, the computer node is selected to process the smart contract transaction and may record the smart contract transaction (e.g., in a block) on its copy of the distributed ledger. The computer node may then broadcast the block and the solution to the mathematical problem to the other computer nodes, such that the other computer nodes can update their copies of the distributed ledger. The computer node that won (e.g., the fastest to solve the mathematical problem) would be granted the right to receive a processing fee (e.g., in the form of a mined token and/or a service fee charged to one or more parties to the smart contract transaction) according to the standard.

The user device 110, in one embodiment, may be utilized by a user 140 to interact with the blockchain computer network 120, the service provider server 130, and other user devices (e.g., the user devices 180 and 190, etc.) over the network 160. For example, the user 140 may use the user device 110 to conduct smart contract transactions through a digital wallet account with other digital wallet accounts by communicating transaction data to the blockchain computer network 120. The user 140 may also log in to a user account to access account services or conduct electronic transactions (e.g., account transfers or payments, purchasing goods and/or services, etc.) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the service provider server 130 over the network 160. In one implementation, the user interface application 112 includes a software program (e.g., a mobile application) that provides a graphical user interface (GUI) for the user 140 to interface and communicate with the service provider server 130 and/or the blockchain computer network 120 via the network 160. In another implementation, the user interface application 112 includes a browser module that provides a network interface to browse information available over the network 160. For example, the user interface application 112 may be implemented, in part, as a web browser to view information available over the network 160.

The user device 110, in one embodiment, may include at least one identifier 114, which may be implemented, for example, as operating system registry entries, cookies associated with the user interface application 112 and/or the wallet application 116, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user 140 with a particular user account, a particular digital wallet (e.g., a cryptocurrency account), and/or a particular profile.

The user device 110 may include a wallet application 116 configured to facilitate smart contract transactions for the user 140. In some embodiments, the wallet application 116 may be associated with a digital wallet account of the user 140 such that tokens can be transferred from the digital wallet account of the user 140 to another digital wallet account of another user using the wallet application 116. In some embodiments, the wallet application 116 may be configured to initiate smart contract transactions. The user 140, through the user interface provided by the wallet application 116 on the user device 110, may provide various parameters for a smart contract transaction (e.g., an identifier associated with a smart contract corresponding to the smart contract transaction, an amount of tokens to be transferred, identifiers of the digital wallet accounts involved in the smart contract transaction, etc.). In some embodiments, the wallet application 116 may initiate a smart contract transaction by broadcasting the transaction data to the computer nodes within the blockchain computer network 120.

In various implementations, the user 140 is able to input data and information into an input component (e.g., a keyboard) of the user device 110. For example, the user 140 may use the input component to interact with the UI application 112 and/or the wallet application 116 to conduct smart contract transactions, etc.

Each of the user devices 180 and 190 may include similar hardware and software components as the user device 110 to enable their respective users to interact with the blockchain computer network 120, the service provider server 130, and other devices (e.g., to conduct smart contract transactions, etc.) through user devices connected via network 160. For example, the users of the user devices 110, 180, and 190 may use the respective devices to conduct smart contract transactions through different user digital wallet accounts. As such, each of the user devices 180 and 190 also includes a wallet application (e.g., the wallet applications 186 and 196, respectively) configured to perform smart contract functionalities, in a similar manner as the wallet application 116.

The service provider server 130, in one embodiment, may be maintained by a transaction processing entity or an online service provider, which may provide processing for electronic transactions between different entities (e.g., among the users of the user devices 110, 180, and 190, between a user and one or more business entities, or other types of payees. The service provider server 130 may include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various services provided by the service provider server 130 (e.g., such as initiating smart contract transactions, generating a smart contract, etc.). The interface server 134 may also include other electronic pages associated with the different services (e.g., electronic transaction services, etc.) offered by the service provider server 130. As a result, a user (e.g., the user 140, users of the user devices 180 and 190, etc.) may access a user account (e.g., a digital wallet account) associated with the user and access various services offered by the service provider server 130, by generating HTTP requests directed at the service provider server 130. In some embodiments, the fragment module integration framework may be implemented within or in association with the interface server 134.

In various embodiments, the service provider server 130 includes a transaction module 132 configured to facilitate smart contract transactions for the users (e.g., the user 140, the users of the user devices 180 and 190, etc.). In some embodiments, the service provider server 130 may be one of the computer nodes within the blockchain computer network 120, and is configured to maintain and manage the distributed ledger (e.g., the blockchain), and process smart contract transactions for various users. As such, the transaction module 132 may have access to a copy of the blockchain, and the smart contracts stored in the copy of the blockchain. As disclosed herein, once a contract issuer generates and records a smart contract on the blockchain, the transaction module 132 may perform smart contract transactions for users by executing the smart contract stored on the blockchain. A block producer, which can be an entity that operates the service provider server 130 and is associated with a digital wallet account, may decide to opt-in to a token-sharing agreement (also referred to as a "fee-sharing agreement") with the contract issuer, such that the contract issuer may share tokens that are derived from processing various smart contract transactions. In some embodiments, the transaction module 132 may record, on the blockchain, a transaction that indicates that the block producer has opted-in to the fee-sharing agreement with the contract issuer according to a format specified by the framework. In some embodiments, to complete the opt-in process, the transaction module 132 may also lock at least a portion of the tokens associated with the digital wallet account of the block producer.

Figure 2:
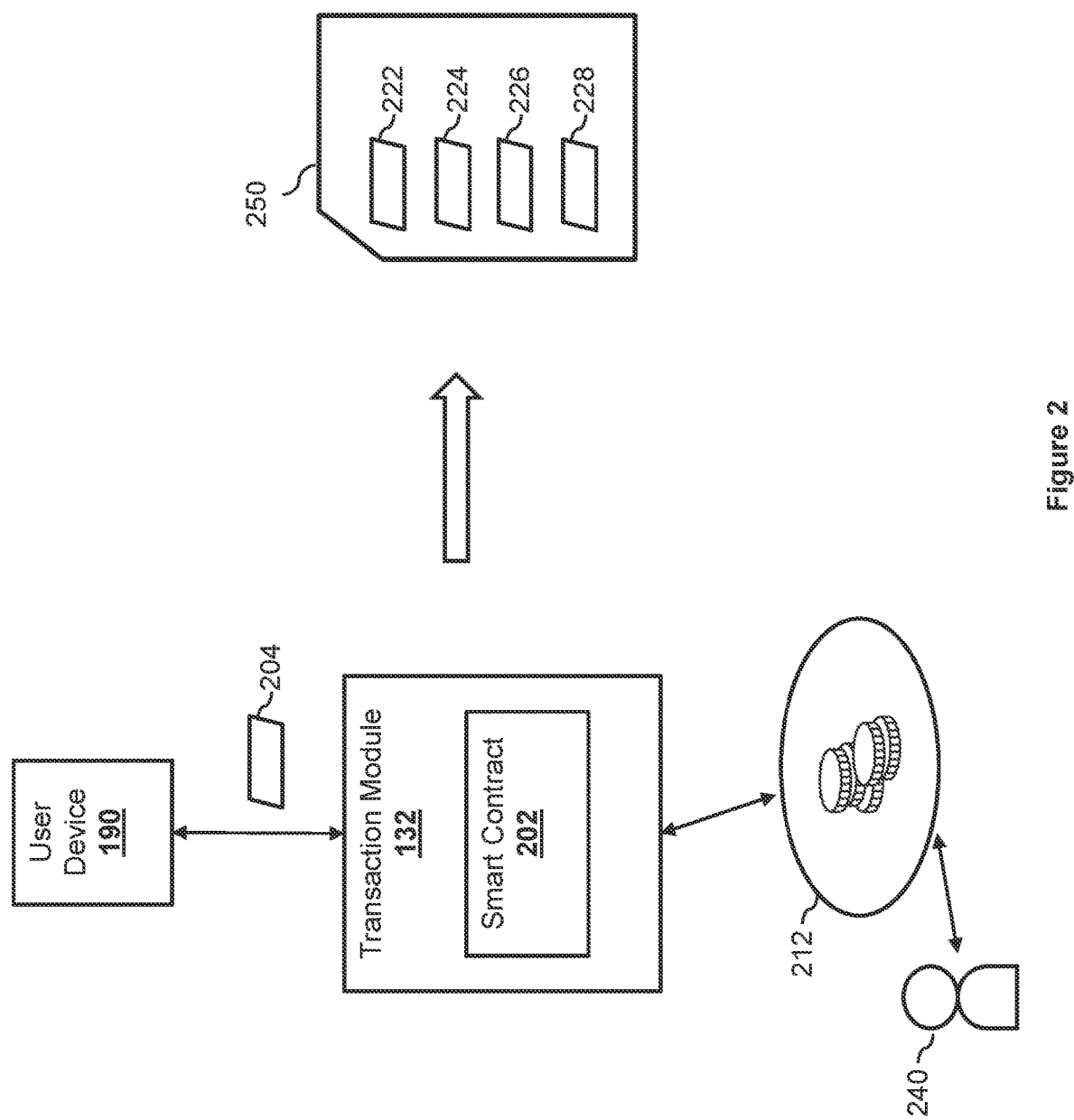
FIGS. 2-3 illustrate various stages in processing smart contract transactions according to an embodiment of the present disclosure.
Figure 3:
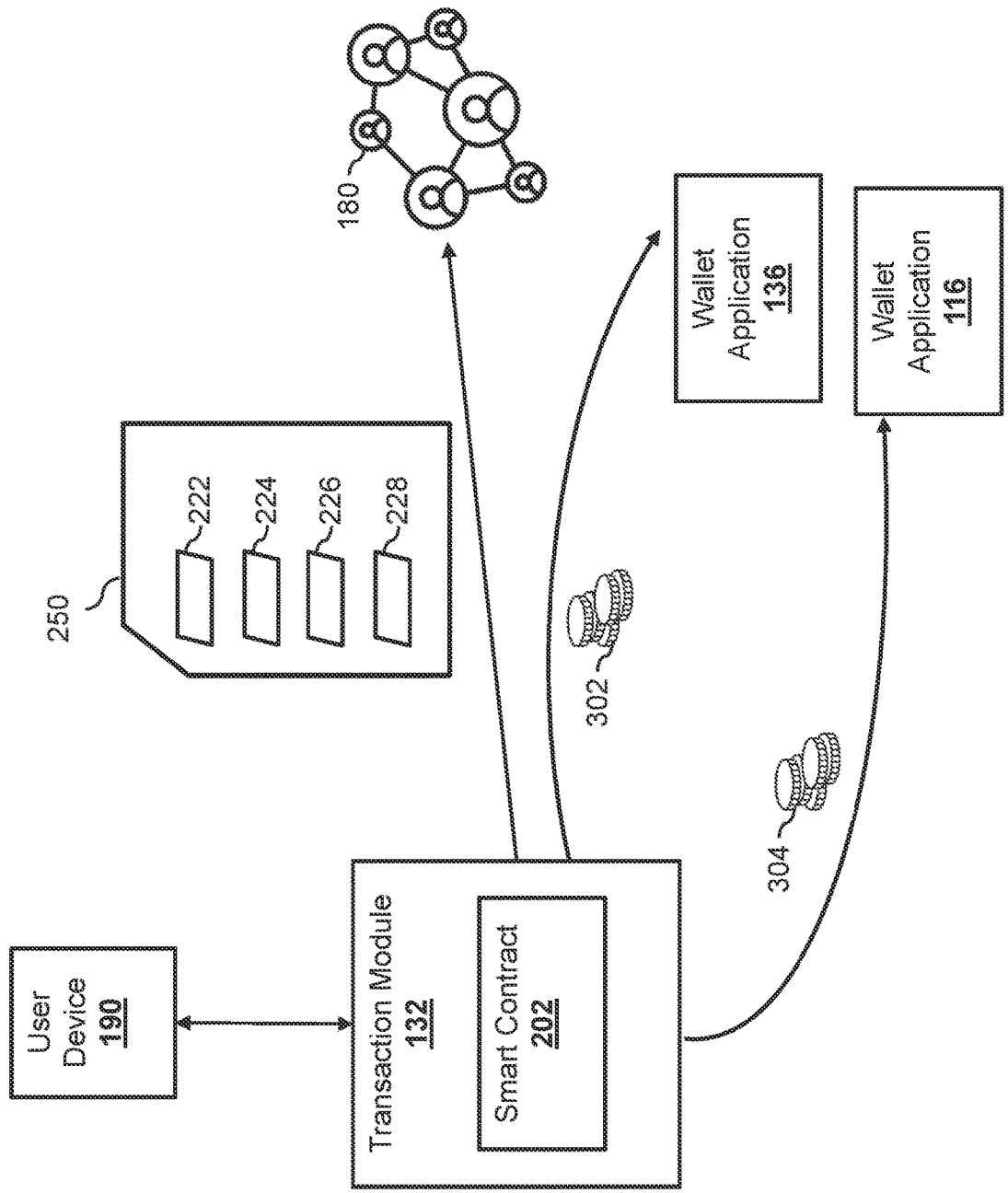

Upon receiving transaction data associated with a smart contract transaction from a user via a wallet application or a transaction application, the transaction module 132 may be configured to broadcast the transaction data to other computer nodes within the blockchain computer network 120, and perform the processes under the framework as disclosed herein. FIGS. 2 and 3 illustrate the data flow associated with processing a smart contract transaction under the framework according to various embodiments of the disclosure. Specifically, FIG. 2 illustrates the generation of a transaction block for recording transactions associated with process a smart contract transaction on a blockchain, and FIG. 3 illustrates the recordation of the block of transactions. As shown in FIG. 2, the user device 190 has transmitted transaction data associated with a smart contract transaction 204 to the transaction module 132. The transaction data may indicate a smart contract 202 corresponding to the smart contract transaction 204 (e.g., using a smart contract identifier corresponding to the smart contract 202), and one or more parameters for use in executing the smart contract 202 in order to process the smart contract transaction 204. Thus, based on the transaction data, the transaction module 132 may identify, from the smart contracts stored on the blockchain, a particular smart contract (e.g., the smart contract 202) corresponding to the smart contract transaction 204. The transaction module 132 may access the smart contract 202 from the blockchain, and execute the smart contract 202 using the one or more parameters indicated in the transaction data.

The smart contract 202 may be created by a contract issuer (e.g., the user 140, also referred to as the contract issuer 140) for performing a set of processes. For example, the smart contract 202 may include programming code for detecting a set of conditions, and automatically transfer tokens between two digital wallet accounts when the set of conditions is satisfied. In this particular example, the smart contract 202 may be associated with settling a payment between a buyer and a seller of goods. Thus, the smart contract 202 may include programming code for detecting whether an item is successfully delivered at a location of the buyer, and for transferring tokens from a digital wallet account of the buyer to a digital wallet account of the seller when it is detected that the item is successfully delivered to the location of the buyer. The smart contract 202 may accept parameters that indicate the identities of the digital wallet accounts of the buyer and the seller, the location at which the item should be delivered and a mechanism for detecting the delivery of the item, and other information such that buyers and sellers of different goods can use the smart contract 202 to automatically settle their purchase transactions.

In this example, the user of the user device 190 may be a buyer of an item being sold by a user of the user device 180. Thus, the transaction data associated with the smart contract transaction 204 may indicate the digital wallet accounts associated with the wallet applications 186 and 196, the location of the delivery of the item, a description of the item, and other information that is specific to the smart contract transaction 204. The transaction module 132 may execute the smart contract 202 based on the transaction data.

If the smart contract 202 is executed outside of the framework, the transaction module 132 may perform the processes associated with the smart contract transaction 204. For example, the transaction module 132 may detect whether the set of conditions required by the smart contract 202 is satisfied, and may perform a transfer of tokens between accounts involved in the smart contract transaction 204 when the set of conditions is satisfied.

However, if the smart contract 202 is executed within the framework, additional computer processes would have been incorporated into the smart contract 202. For example, by executing the smart contract 202, the transaction module 132 may detect whether a block producer 240 associated with the service provider server 130 (e.g., a person or an entity that controls and operates the service provider server 130 for recording transactions on the blockchain) has opted-in to a fee-sharing agreement with a contract issuer (e.g., the user 140) who created the smart contract 202. For example, the transaction module 132, based on executing the smart contract 202, may traverse the blockchain managed by the blockchain computer network 120 to determine whether a transaction that indicates the block producer 240 opting-in to the fee-sharing agreement with the contract issuer 140 is recorded on the blockchain. In some embodiments, the transaction may simply include the identity of an account of the block producer 240, and data that indicates the block producer's decision to opt-in to the fee-sharing agreement. In some embodiments, the transaction may further include instructions for either authorizing third-parties to access the account associated with the block producer 240 or locking at least a portion of the tokens controlled by the account of the block producer 240.

If it is determined that the block producer 240 has not opted-in to the fee-sharing agreement with the contract issuer 140 (e.g., no such transaction indicating an opt-in to the fee-sharing agreement by the account of the block producer 240 is found in the blockchain, etc.), the transaction module 132, based on executing the smart contract 202, may process the smart contract transaction 204 as if the smart contract 202 is executed outside of the framework.

If it is determined that the block producer 240 has opted-in to the fee-sharing agreement with the contract issuer 140, the transaction module 132, based on executing the smart contract 202, may perform a set of additional procedures under the framework. The set of additional procedures may include procedures for increasing the processing fees charged to the parties (the users of the user devices 180 and 190) and procedures for sharing at least a portion of the additional processing fee with the contract issuer 140. In order to incentivize block producers to share tokens with contract issuers for processing smart contract transactions, the framework enables allocation of additional processing fees to a block producer who opted-in to the fee sharing agreement. As discussed herein, since the processing fee is directly tied to the amount of computer processing resources required or used to process a smart contract transaction according to the standard, in order to increase the processing fee for processing the smart contract transaction 204, the transaction module 132, based on executing the smart contract 202, may perform a set of computer procedures. The set of computer procedures may include computer processes that are non-productive (e.g., non-essential) to the processing of the smart contract transaction 204. In other words, the transaction module 132 may successfully process the smart contract transaction 204 without performing the set of non-productive computer procedures.

In some embodiments, the transaction module 132, based on executing the smart contract 202, may dynamically determine the amount of additional processing fees to charge for processing the smart contract transaction 204 based on one or more factors, such as an amount of tokens involved in the smart contract transaction (e.g., an amount of tokens to be transferred between the parties when the set of conditions is satisfied, etc.), identities of the parties involved in the smart contract transaction, a time of day, a number of transactions being processed by the transaction module 132 within a time period (e.g., the last hour, the last day, etc.), or any other factors. For example, a larger amount of additional processing fees may be charged for processing the smart contract transaction 204 when the amount of tokens involved in the smart contract transaction 204 is large (e.g., above a threshold) and a smaller amount of additional processing fees may be charged for processing the smart contract transaction 204 when the amount of tokens involved in the smart contract transaction 204 is small (e.g., below a threshold). Similarly, a larger amount of additional processing fees may be charged for processing the smart contract transaction 204 when the number of smart contract transactions processed by the transaction module 132 within the time period is large (e.g., above a threshold), and a smaller amount of additional processing fee may be charged for processing the smart contract transaction 204 when the number of transactions processed by the smart contract transaction 204 within the time period is small (e.g., below a threshold). As such, the transaction module 132 may determine to charge different amounts of additional processing fees for processing different smart contract transactions even though the different smart contract transactions correspond to the same smart contract (e.g., the smart contract 202).

Accordingly, the transaction module 132 may access relevant information for calculating the additional processing fee to charge for processing the smart contract transaction 204. In some embodiments, in order to be able to dynamically adjust the additional processing fee to charge for processing smart contract transactions, the smart contract 202 may include the programming code corresponding to the set of computer procedures within a loop (e.g., a "for" loop, a "while" loop, etc.) such that the transaction module 132 may iteratively perform the set of procedures. In some embodiments, the transaction module 132 may be configured, based on executing the smart contract 202, to iteratively perform the set of procedures a number of times in proportion to the additional amount of processing fees determined to charge for processing the smart contract transaction 204. Thus, the larger the additional amount of processing fees, the more iterations of the set of computer procedures the transaction module 132 would perform. The transaction module 132 may perform the set of computer procedures iteratively for the number of times determined by the transaction module 132, as part of processing the smart contract transaction 204.

In some embodiments, the transaction module 132 may, based on executing the smart contract 202, lock tokens 212 controlled by the block producer 240. The tokens 212 may represent a portion of the total amount of tokens controlled by the block producer 240. In some embodiments, amount or number of the tokens 212 that is locked is at least the additional amount of processing fee determined for the smart contract transaction 204. The locking of the tokens 212 may serve to guarantee that the block producer 240 has sufficient tokens to share with the contract issuer 140 and that the tokens 212 cannot be used by the block producer 240 during the processing of the smart contract transaction 204. As such, the amount of tokens to lock for the smart contract transaction 204 may be proportional to the additional amount of processing fee determined by the transaction module 132 to charge for the processing the smart contract transaction 204.

To lock the tokens 212 associated with the block producer 240, the transaction module 132 may, based on executing the smart contract 202, generate transaction data 222 associated with locking the tokens 212, and inserting the transaction data 222 into a block 250 to be recorded on the blockchain. The transaction data 222 may include a timestamp associated with the time when the transaction data 222 is generated, the amount of tokens in the tokens 212, identifiers of the tokens 212, and an identifier associated with an account of the block producer 240. In some embodiments, if the block 250 has not been created, the transaction module 132 may also generate a new block 250 for recording the transactions associated with the smart contract transaction 204.

After locking the tokens 212, the transaction module 132 may continue to process the smart contract transaction 204 based on executing the smart contract 202 with the parameters associated with the smart contract transaction 204 (e.g., performing a set of computer procedures that is productive with respect to the processing of the smart contract transaction 204). For example, the transaction module 132 may monitor the set of conditions specified in the smart contract 202 and the smart contract transaction 204 (e.g., monitoring whether the item specified by the smart contract transaction 204 has been delivered at a location specified in the smart contract transaction 204, etc.). The transaction module 132 may also perform any calculations or computations required by the smart contract 202 and the smart contract transaction 204. In some embodiments, the transaction module 132 may communicate with one or more external devices and/or sensors to determine whether the set of conditions have been satisfied. If it is determined that the set of conditions has not been satisfied, the transaction module 132 may continue to monitor the set of conditions by communicating with the external devices and/or sensors. In some embodiments, the transaction module 132 may be configured, based on executing the smart contract 202, to communicate with the external devices and/or sensors periodically (e.g., every five seconds, every hour, every day, etc.) to detect whether the set of conditions is satisfied.

If it is detected that the set of conditions has been satisfied, the transaction module 132, based on executing the smart contract 202, may process a transfer of tokens between accounts of the parties involved in the smart contract transaction 204 (e.g., the users of the user devices 180 and 190, respectively). To process the transfer of tokens, the transaction module 132 may generate transaction data 224 associated with the transfer of the tokens. The transaction data 224 may include a timestamp indicating a time when the transaction data 224 is generated, account identifiers of the account associated with the user of the user device 180 and the account associated with the user of the user device 190, identifiers associated with the tokens being transferred, an amount of tokens being transferred, etc. The transaction module 132 may also insert the transaction data 224 into the block 250 to be recorded on the blockchain.

As discussed herein, the block producer 240 may receive compensation in the form of a processing fee for processing the smart contract transaction 204, which is tied directly to the amount of computer processing resources required or used by the transaction module 132 to process the smart contract transaction 204. Due to the incorporation of the set of computer procedures that is non-productive to the processing of the smart contract transaction 204, the block producer is able to obtain an additional amount of processing fee, which is not available to the block producer if the smart contract transaction 204 was processed outside of the framework (e.g., without the inclusion of the set of computer procedures).

In some embodiments, after obtaining the processing fee, the transaction module 132 may determine a portion of the processing fee to share with the contract issuer 140. In some embodiments, the portion of the processing fee for sharing with the contract issuer 140 is a percentage (e.g., 50%, 80%, etc.) of the additional amount of processing fee charged for processing the smart contract transaction 204. The transaction module 132 may then generate transaction data 226 associated with transferring the portion of the processing fee from the account of the block producer 240 to the account of the contract issuer 140. The transaction data 226 may include a timestamp indicating a time when the transaction data 226 is generated, an amount of tokens corresponding to the portion of the processing fee, and the identifiers of the account of the block producer 240 and the account of the contract issuer 140. The transaction module 132 may also insert the transaction data 226 into the block 250 for recording on the blockchain.

After recording the transaction for transferring (e.g., sharing) the portion of the processing fee to the account of the contract issuer, the transaction module 132 may unlock the tokens 212 (or what is remaining of the tokens 212 after the transfer). As such, the transaction module 132 may generate transaction data 228 (which includes another timestamp indicating a time when the transaction data 228 is generated) associated with unlocking the tokens 212, and may insert the transaction data 228 into the block 250. The timestamps included in the transaction data 222, 224, 226, and 228 ensure that the transactions are processed in the correct order. In some embodiments, the transaction module 132 may also include other transactions (transactions that are unrelated to the smart contract transaction 204) into the block 250 before recording the block 250 on the blockchain.

FIG. 3 illustrates the recordation of the block 250 comprising transaction data 222, 224, 226, and 228 on the blockchain. In some embodiments, to record the block 250 on the blockchain, the transaction module 132 may add the block 250 to the copy of blockchain stored locally with the service provider server 130, and broadcast the block 250 to the other computer nodes within the blockchain computer network 120, such that the other computer nodes can verify the block 250 and add the block 250 to their copies of the blockchain. The recordation of the block 250 completes the processing of the smart contract transaction 204. As a result of the processing of the smart contract transaction 204, tokens may be transferred between the accounts associated with the wallet applications 186 and 196. Furthermore, one or more of the accounts associated with the wallet applications 186 and 196 may be charged with a processing fee 302 for processing the smart contract transaction 204. The processing fee 302 would be transferred from one or more of the accounts associated with the wallet applications 186 and 196 to the account of the block producer 240 (e.g., to the account associated with the wallet application 136). Tokens 304 that correspond to a portion of the processing fee (the portion that is shared with the contract issuer 140) may also be transferred from the account of the block producer 240 to the account of the contract issuer 140 (e.g., to the account associated with the wallet application 116).

Using the arrangement as disclosed herein under the framework, processing fees for processing smart contract transactions may be shared between the block producers and the contract issuers while complying with the standard that facilitates the processing of smart contracts.

Figure 4:
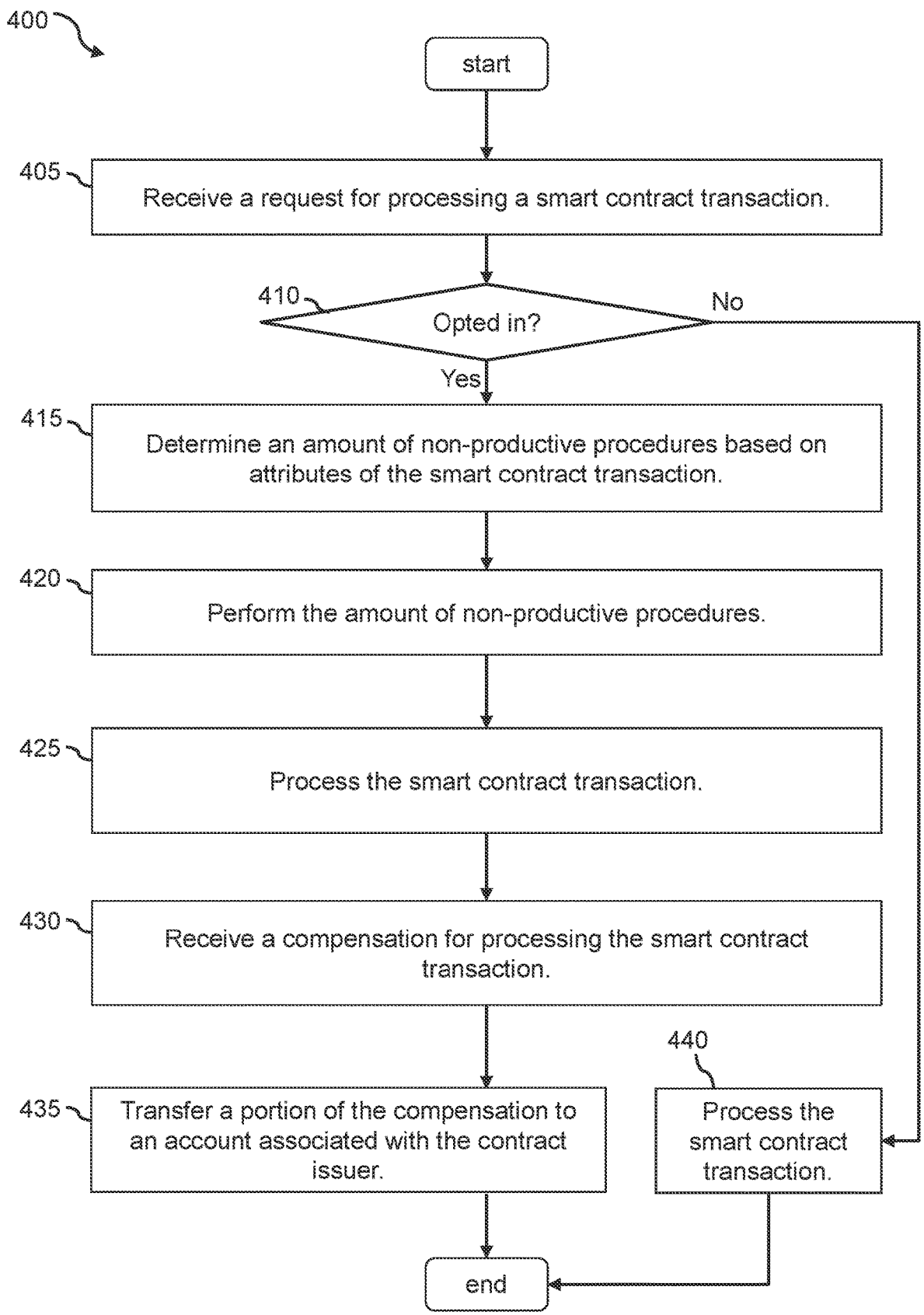
FIG. 4 is a flowchart showing a process of processing a smart contract transaction according to an embodiment of the present disclosure.

FIG. 4 illustrates a process 400 for processing smart contract transactions under the framework according to various embodiments of the disclosure. In some embodiments, at least a portion of the process 400 may be performed by the transaction module 132. The process 400 may begin by receiving (at step 405) a request for processing a smart contract transaction. For example, the service provider server 130, via an interface generated by the interface server 134, may receive a request for processing the smart contract transaction 204 from the user device 190. The transaction module 132 may traverse the blockchain to determine that the smart contract transaction 204 corresponds to the smart contract 202 generated by the contract issuer 140. Thus, the transaction module 132 may execute the smart contract 202 based on one or more parameters specified in the smart contract transaction 204.

The process 400 then determines (at step 410) whether a block producer associated with the computer node configured to process the smart contract transaction has opted-in to a fee sharing agreement with a contract issuer. For example, the transaction module 132 may traverse the blockchain to determine whether a transaction associated with the block producer 240 opting-in to the fee sharing agreement with the contract issuer 140 has been recorded. If it is determined that the block producer has not opted-in to the fee sharing agreement, the process 400 may move directly to step 440 and may process the smart contract transaction.

On the other hand, if it is determined that the block producer has opted-in to the fee sharing agreement, the process 400 may perform procedures for sharing the processing fee associated with processing the smart contract transaction with the contract issuer. The procedures include determining (at step 415) an amount of non-productive procedures based on attributes of the smart contract transaction and performing (at step 420) the amount of non-productive procedures. For example, the transaction module 132 may determine a number of times to iteratively perform the set of computer procedures in order to increase the processing fee charged for processing the smart contract transaction 204. In some embodiments, the transaction module 132 may determine the number of times to iteratively perform the set of computer procedures based on one or more factors such as an amount of tokens involved in the smart contract transaction 204 (e.g., an amount of tokens that is transferred between the parties), identities of the parties involved in the smart contract transaction 204, a time of day, a number of transactions being processed by the transaction module 132 within a time period (e.g., the last hour, the last day, etc.), or any other factors. The transaction module 132 may then perform the set of computer procedures iteratively for the number of times.

The process 400 then processes (at step 425) the smart contract transaction. For example, the transaction module 132 may determine whether a set of conditions specified in the smart contract 202 and the smart contract transaction 204 is satisfied. If the set of conditions is satisfied, the transaction module 132 may transfer tokens between accounts of the parties involved in the smart contract transaction 204 (e.g., accounts associated with the wallet application 186 and the wallet application 196, etc.).

The process 400 then receives (at step 430) a compensation for processing the smart contract transaction and transfers (at step 435) a portion of the compensation to an account associated with the contract issuer. For example, as a result of processing the smart contract transaction 204, the block producer 240 may receive a processing fee 302 from the parties involved in the smart contract transaction. The processing fee may correspond to the amount of computer processing resources required or used by the transaction module 132 to process the smart contract transaction 204. In some embodiments, the block producer 240 receives an additional amount of processing fee within the framework due to the performance of the set of computer procedures that is non-productive to the processing of the smart contract transaction 204. The transaction module 132 may share a portion of the additional amount of processing fee with the contract issuer 140.

FIG. 5 is a block diagram of a computer system 500 suitable for implementing one or more embodiments of the present disclosure, including the service provider server 130, any computer node within the cryptocurrency computer network 120, and the user devices 110, 180, and 190. In various implementations, each of the devices 110, 180, and 190 may include a mobile cellular phone, personal computer (PC), laptop, wearable computing device, etc. adapted for wireless communication, and each of the service provider server 130 and any node in the blockchain computer network 120 may include a network computing device, such as a server. Thus, it should be appreciated that the devices/servers 110, 130, 180, and 190, and any computer nodes in the blockchain computer network 120 may be implemented as the computer system 500 in a manner as follows.

The computer system 500 includes a bus 512 or other communication mechanism for communicating information data, signals, and information between various components of the computer system 500. The components include an input/output (I/O) component 504 that processes a user (i.e., sender, recipient, service provider) action, such as selecting keys from a keypad/keyboard, selecting one or more buttons or links, etc., and sends a corresponding signal to the bus 512. The I/O component 504 may also include an output component, such as a display 502 and a cursor control 508 (such as a keyboard, keypad, mouse, etc.). The display 502 may be configured to present a login page for logging into a user account. An optional audio input/output component 506 may also be included to allow a user to use voice for inputting information by converting audio signals. The audio I/O component 506 may allow the user to hear audio. A transceiver or network interface 520 transmits and receives signals between the computer system 500 and other devices, such as another user device, a merchant server, or a service provider server via a network 522, such as network 160 of FIG. 1. In one embodiment, the transmission is wireless, although other transmission mediums and methods may also be suitable. A processor 514, which can be a micro-controller, digital signal processor (DSP), or other processing component, processes these various signals, such as for display on the computer system 500 or transmission to other devices via a communication link 524. The processor 514 may also control transmission of information, such as cookies or IP addresses, to other devices.

The components of the computer system 500 also include a system memory component 510 (e.g., RAM), a static storage component 516 (e.g., ROM), and/or a disk drive 518 (e.g., a solid-state drive, a hard drive). The computer system 500 performs specific operations by the processor 514 and other components by executing one or more sequences of instructions contained in the system memory component 510. For example, the processor 514 can perform the functionalities related to processing smart contract transactions described herein according to the process 400.

Logic may be encoded in a computer readable medium, which may refer to any medium that participates in providing instructions to the processor 514 for execution. Such a medium may take many forms, including but not limited to, non-volatile media, volatile media, and transmission media. In various implementations, non-volatile media includes optical or magnetic disks, volatile media includes dynamic memory, such as the system memory component 510, and transmission media includes coaxial cables, copper wire, and fiber optics, including wires that comprise the bus 512. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 500. In various other embodiments of the present disclosure, a plurality of computer systems 500 coupled by the communication link 524 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system associated with a transaction service provider, comprising:
   a non-transitory memory; and
   one or more hardware processors coupled with the non-transitory memory and configured to read instructions from the non-transitory memory to cause the system to perform operations comprising:
      receiving a request for processing a smart contract transaction, wherein the smart contract transaction corresponds to a smart contract recorded on a blockchain and created by a contract issuer;
      determining whether the transaction service provider has opted-in to a token sharing scheme based on a record retrieved from the blockchain;

in response to determining that the transaction service provider has opted-in to the token sharing scheme, performing, based on executing the smart contract, a first set of computer procedures in association with processing the smart contract transaction, wherein the first set of computer procedures is non-productive with respect to the processing of the smart contract transaction;

generating a first set of transaction instructions for locking a set of tokens associated with a first account of the transaction service provider;

inserting the first set of transaction instructions into a first block associated with the blockchain;

performing a second set of computer procedures that is productive with respect to the processing of the smart contract transaction, wherein the performing the second set of computer procedures comprises (i) generating a second set of transaction instructions associated with the smart contract and (ii) inserting the second set of transaction instructions into the first block;

retrieving, from the locked set of tokens, an amount of tokens based on the first set of computer procedures; and transmitting the amount of tokens to a second account of the contract issuer.

2. The system of claim 1, wherein the operations further comprise recording the first block on the blockchain.

3. The system of claim 2, wherein the amount of tokens is a first amount of tokens, and wherein the operations further comprise:
determining that the set of tokens includes a second amount of tokens larger than the first amount of tokens.

4. The system of claim 1, wherein the second set of transaction instructions is associated with transferring funds from a third account to a fourth account.

5. The system of claim 1, wherein the operations further comprise:
determining a number of iterations for performing the first set of computer procedures based on one or more attributes associated with the smart contract transaction, wherein the performing the first set of computer procedures comprises performing the first set of computer procedures for the number of iterations.

6. The system of claim 5, wherein the operations further comprise:
determining the amount of tokens based on the number of iterations.

7. The system of claim 5, wherein the one or more attributes comprise at least one of a value being transferred according to the smart contract transaction, one or more identities associated with one or more parties involved in the smart contract transaction, a time of day, or a volume of smart contract transactions being processed by the system within a period of time.

8. A method, comprising:
receiving, by a computer node associated with a blockchain network, a request for processing a smart contract transaction, wherein the smart contract transaction corresponds to a smart contract created by a contract issuer;

determining that the computer node has opted-in to a token sharing scheme based on a record retrieved from a blockchain associated with the blockchain network;

in response to determining that the computer node has opted-in to the token sharing scheme, performing, by the computer node based on executing the smart contract, a first set of computer procedures in association with processing the smart contract transaction, wherein the first set of computer procedures is non-productive with respect to the processing of the smart contract transaction;

generating, by the computer node, a first set of transaction instructions for locking a set of tokens associated with a first account of the computer node;

performing, by the computer node and based on executing the smart contract, a second set of computer procedures in association with the processing the smart contract transaction, wherein the second set of computer procedures is productive with respect to the processing of the smart contract transaction, and wherein the performing the second set of computer procedures comprises generating a second set of transaction instructions associated with the smart contract;

inserting, by the computer node, the first set of transaction instructions and the second set of transaction instructions into a first block associated with the blockchain;

obtaining, from the locked set of tokens, an amount of tokens based on the processing of the smart contract transaction; and transferring at least a portion of the amount of tokens to a second account of the contract issuer.

9. The method of claim 8, further comprising:
subsequent to the transferring the at least the portion of the amount of tokens to the second account, unlocking the set of tokens.

10. The method of claim 8, wherein the first set of computer procedures causes an increase of processing fee charged by the computer node for the processing of the smart contract transaction, and wherein the operations further comprise:
determining the portion of the amount of tokens based on the increase of the processing fee.

11. The method of claim 8, wherein the smart contract is issued based on an ERC-20 standard.

12. The method of claim 8, further comprising:
recording the first block on the blockchain.

13. The method of claim 8, further comprising:
determining a number of times for performing the first set of computer procedures based on one or more attributes associated with the smart contract transaction, wherein the performing the first set of computer procedures comprises iteratively performing the first set of computer procedures the number of times.

14. The method of claim 13, wherein the one or more attributes comprise at least one of a value being transferred according to the smart contract transaction, one or more identities associated with one or more parties involved in the smart contract transaction, a time of day, or a volume of smart contract transactions being processed by the computer node within a period of time.

15. A non-transitory machine-readable medium having stored thereon machine-readable instructions executable to cause a computer node that is part of a blockchain network to perform operations comprising:
receiving a request for processing a smart contract transaction, wherein the smart contract transaction corresponds to a smart contract recorded on a blockchain and created by a contract issuer;

determining whether a transaction service provider associated with the computer node has opted-in to a token sharing scheme based on a record retrieved from the blockchain;

in response to determining that the transaction service provider has opted-in to the token sharing scheme, performing, based on executing the smart contract, a first set of computer procedures in association with processing the smart contract transaction, wherein the first set of computer procedures is unnecessary with respect to the processing of the smart contract transaction;

generating a first set of transaction instructions for locking a set of tokens associated with a first account of the transaction service provider;

performing a second set of computer procedures that is necessary with respect to the processing of the smart contract transaction, wherein the performing the second set of computer procedures comprises generating a second set of transaction instructions associated with the smart contract;

inserting the first set of transaction instructions and the second set of transaction instructions into a first block associated with the blockchain;

retrieving, from the locked set of tokens, an amount of tokens for the contract issuer; and transmitting the amount of tokens to a second account of the contract issuer.

16. The non-transitory machine-readable medium of claim 15, wherein the operations further comprise recording the first block on the blockchain.

17. The non-transitory machine-readable medium of claim 16, wherein the amount of tokens is a first amount of tokens, and wherein the operations further comprise:
determining that the set of tokens pool includes a second amount of tokens larger than the first amount of tokens.

18. The non-transitory machine-readable medium of claim 15, wherein the second set of transaction instructions is associated with transferring funds from a third account to a fourth account.

19. The non-transitory machine-readable medium of claim 15, wherein the operations further comprise:
determining a number of iterations for performing the first set of computer procedures based on one or more attributes associated with the smart contract transaction, wherein the performing the first set of computer procedures comprises performing the first set of computer procedures for the number of iterations.

20. The non-transitory machine-readable medium of claim 19, wherein the one or more attributes comprise at least one of a value being transferred according to the smart contract transaction, one or more identities associated with one or more parties involved in the smart contract transaction, a time of day, or a volume of smart contract transactions being processed by the computer node within a period of time.

* * * * *

UNITED STATES PATENT AND TRADEMARK OFFICE
CERTIFICATE OF CORRECTION

| | | |
|---|---|---|
| PATENT NO. | : 12,169,813 B2 | Page 1 of 1 |
| APPLICATION NO. | : 17/941850 | |
| DATED | : December 17, 2024 | |
| INVENTOR(S) | : Ben Riva and Sujay Vijay Purandare | |

It is certified that error appears in the above-identified patent and that said Letters Patent is hereby corrected as shown below:

In the Claims

Claim 17, Column 22, Line 4, change "the set of tokens pool includes a second" to --the set of tokens includes a second--.

Signed and Sealed this
Nineteenth Day of August, 2025

Coke Morgan Stewart
*Acting Director of the United States Patent and Trademark Office*